United States Patent [19]

Schmidt et al.

[11] Patent Number: 4,987,329

[45] Date of Patent: Jan. 22, 1991

[54] MOTOR MAGNET ARRANGEMENT

[75] Inventors: Helmut Schmidt, Reichenberg; Ernst Grecksch, Estenfeld; Manfred Eisenmann, Wiesentheid, all of Fed. Rep. of Germany

[73] Assignee: Siemens Aktiengesellschaft, Berlin & Munich, Fed. Rep. of Germany

[21] Appl. No.: 242,703

[22] Filed: Sep. 9, 1988

[30] Foreign Application Priority Data

Sep. 11, 1987 [DE] Fed. Rep. of Germany ....... 3730596

[51] Int. Cl.$^5$ .................... H02K 21/12; H02K 1/22; H02K 1/27
[52] U.S. Cl. ................... 310/156; 310/67 R; 310/152
[58] Field of Search .............. 310/156, 154, 152, 67 R

[56] References Cited

U.S. PATENT DOCUMENTS

| | | | |
|---|---|---|---|
| 3,334,254 | 8/1967 | Kober | 310/156 |
| 3,969,644 | 7/1976 | Novak | 310/156 |
| 4,219,752 | 8/1980 | Katou | 310/156 |
| 4,417,186 | 11/1983 | Hirose | 310/156 |

FOREIGN PATENT DOCUMENTS

| | | |
|---|---|---|
| 1181306 | 11/1964 | Fed. Rep. of Germany . |
| 2845702 | 4/1980 | Fed. Rep. of Germany ..... 56-157251/031982JPX |
| 2403676 | 4/1979 | France . |
| 2565017 | 11/1985 | France . |
| 2593974 | 2/1986 | France . |
| 57-71257 | 8/1982 | Japan . |
| 57-122663 | 11/1982 | Japan . |
| 58-54858 | 6/1983 | Japan . |

OTHER PUBLICATIONS

Research Disclosure No. 207, July 1981, p. 251.

Primary Examiner—Steven L. Stephan
Assistant Examiner—C. LaBalle
Attorney, Agent, or Firm—Kenyon & Kenyon

[57] ABSTRACT

In order to reduce, in a permanent magnet-excited electric motor with at least four poles, the cost for the machining and assembly of a magnet arrangement and to thereby lower the production costs, a magnet arrangement with a magnetic surface radially magnetized with an alternating pole sequence which is composed of three individual segments following each other in the circumferential direction, with a pole division extending beyond two adjacent individual segments.

4 Claims, 1 Drawing Sheet

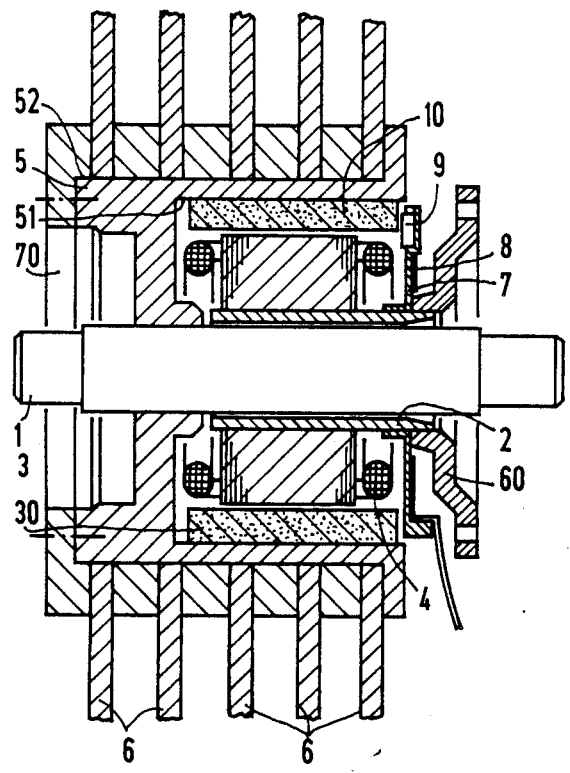

10

MOTOR MAGNET ARRANGEMENT

BACKGROUND OF THE INVENTION

The present invention relates to a magnet arrangement for a permanent magnet-excited electric motor with a radially magnetized magnet surface which occupies the entire circumference in the direction of a pole sequence alternating over the circumference which comprises individual segments magnetized with several poles which follow each other in the circumferential direction, such a magnet arrangement for a permanent-magnet-excited rotor is known from RESEARCH DISCLOSURE No. 207, July 1981, page 251.

In the above-mentioned known magnet arrangement, eight individual segments are cemented over the outer circumference of a rotor support body with end faces spaced from each other which are radially magnetized with several poles with a pole division (pitch) symmetrical as to each individual segment.

From DE-AS 11 81 306, a stator magnet arrangement for a miniature electric motor is known which consists of at least two individual segments which are designed as shell-shaped poles and are magnetized in the radial direction. The one individual segment is magnetized in the direction of the North pole and the other individual segment in the direction of the South pole.

DE-OS 28 45 702 relates to a rotor magnet arrangement with a closed magnet ring which is held concentrically to the rotor shaft of a synchronous motor and is radially magnetized in a pole sequence alternating over the circumference.

SUMMARY OF THE INVENTION

It is an object of the present invention to be able to achieve a high power density in a magnet arrangement of the type mentioned above in spite of minimal production costs. Starting from the insight that narrow magnet tolerances and small air gaps are responsible for high efficiency, this requires in particular, a small share of the costs for the exact machining in the sense of smaller tolerances of the magnets which are to be designed preferably in the shape of circular segments.

The above and other objects of the invention are achieved by a magnet arrangement for a permanent magnet-excited electric motor with a radially magnetized magnet surface which occupies the entire circumference in the direction of a pole sequence alternating over the circumference which is composed of individual segments magnetized with several poles which follow each other in the circumferential direction, wherein by the feature that the magnet surface is formed by three individual segments with a pole division which extends over two adjacent individual segments.

Through the use of three preferably circular segment-shaped individual segments which are magnetized with an asymmetrical pole division with several poles and which, with the number of poles as large as desired, have a larger tangential length as compared to conventional comparable individual segments, the cost for grinding, surface finish, handling, cementing and assembly of the individual segments which are approximately proportional to the number of the required individual segments can be reduced since the magnet arrangement according to the invention, with a closed circumferential surface, requires fewer individual segments than magnet arrangements heretofore used and nevertheless permits any desired number of poles.

An advantageous use of uniform components is obtained by the employment of individual segments of tangentially the same length, by which the picking out, picking up and assembly of individual segments of different size which is unfavorable particularly for automatic production is avoided. At the same time, cost-effective stocking is obtained by storing only one type of individual segments for a given size of an electric motor where no limitation in the selection of the number of poles per individual segment is imposed by the asymmetrical pole division and the pole division extending over adjacent individual segments in the circumferential direction.

The use, provided according to a special embodiment of the invention in disk memories known, for instance, from French Patent No. A-2 565 017, requires at high power densities, reliable prevention of particle separation of the individual segments, since the storage disks rotate in the clean space of the disk memory. The desired high power density is achieved here by a small air gap or by narrow magnet tolerances, i.e., with high costs for grinding. The separation of particles is prevented by a surface coating of the individual segments.

BRIEF DESCRIPTION OF THE DRAWINGS

The invention will be explained in the following in greater detail, making reference to the embodiment examples schematically shown in the drawings wherein:

FIG. 1 shows an axial longitudinal section through an external-rotor motor provided for driving the disk spindle of a disk memory drive;

FIG. 2 shows a top view from the end face onto a four-pole magnet arrangement with three individual segments occupying the entire circumference; and FIG. 3 shows a top view on the end face onto an eight-pole magnet arrangement with three individual segments occupying the entire circumference.

DETAILED DESCRIPTION

FIG. 1 shows in an axial longitudinal section an external rotor motor which drives the disk spindle 5 of a disk memory firmly connected at the left end to the rotor shaft 1. The rotor shaft 1 is rotatably supported on both sides in bearings not shown and is surrounded between these bearings by an inner sleeve 2, onto which the stator lamination stack 3 with the stator winding 4 is pressed. The right end of the inner sleeve 2 is taken up by a mounting flange 60, by which the entire disk memory drive is held in a data processing equipment. On the right end of the inner sleeve 2 is furthermore fastened a support plate for electric control elements, not explained here in detail, which extends radially up to the right free end faces of the individual segments 10, on the outward end face of the support plate 7 is fastened a flexible conductor foil 8 and on the inward end face are fastened Hall transducers of which only one Hall transducer 9 is visible in a cross section. On the outer circumference surface 52 of the disk spindle 5 designed as the rotor bell of the external rotor motor, storage disks 6 are fastened by means of a snap ring 70.

On the inner circumference surface 51 of the disk spindle 5, individual segments which are magnetized radially opposite the stator lamination stack 3 are arranged, of which two individual segments 10, 30 are visible in cross section in FIG. 1.

FIG. 2 shows in an end-face top view an embodiment of the magnet arrangement fastened to the inner circumference area 51 of the disk spindle 5 according to FIG. 1. It consists of three individual segments 10, 20, 30 of tangentially equal length which form a magnetic surface occupying the entire inner circumference. By uneven pole division in two individual segments 10, 30 and by a pole division extending over two adjacent individual segments, four-pole magnetization is obtained with only three individual segments 10, 20, 30. In detail, the individual segments 10, 20, 30 are occupied, according to one advantageous embodiment of the invention, with a pole sequence changing over the circumference by the poles 11 to 14 in such a manner that a first individual segment 10 is occupied by a complete first pole 11 and ⅓ of a following second pole 12; that a next-following individual segment 20 is occupied by ⅔ of the second pole 12 and ⅔ of the third pole 13; and that a third individual segment 30 is occupied by ⅓ by the third pole 13 and a complete fourth pole 14.

FIG. 3 shows a further embodiment of the magnet arrangement according to the invention in a top view on the end face. It consists likewise of three individual segments 10, 20, 30 of tangentially equal length which form a magnetic surface which occupies the entire inside circumference surface 51 of the magnet spindle 5 according to FIG. 1 and of which two individual segments 10, 30 are magnetized with three poles and an individual segment 20 is magnetized with four poles, so that an eight-pole magnet arrangement is obtained. In detail, the individual segments 10, 20, 30 are occupied, according to one advantageous embodiment of the invention, by the poles 11 to 18 in a pole sequence changing over the circumference in such a manner that a first individual segment 10 is occupied by a complete first pole 11 and a complete second pole 12 and by ⅔ of a third pole 13; that a next-following second individual segment 20 is occupied by ⅓ of a third pole 13 of a sixth pole 16; and that a third individual segment 30 is occupied by ⅔ of the sixth pole 16, a complete seventh pole 17 and a complete eighth pole 18.

In place of the external rotor motor shown in the embodiments, an internal rotor motor can, of course, also be provided in an advantageous application of the invention without straying from its concept thereby.

It would seem clear that the purpose to reduce the cost for the machining and assembly of the magnet arrangement is achieved, according to the invention, by a magnet arrangement in which individual segments arranged distributed over the circumference are provided, the number of which is smaller than the number of the poles and of which at least one individual segment is magnetized with several poles and asymmetrical pole division.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A magnet arrangement for a permanent magnet-excited electric motor, the magnet arrangement comprising a radial magnet having a radially magnetized magnet surface, said magnet surface having a circumference, the circumference having a pole sequence which alternates over the circumference of the magnet surface, said magnet arrangement comprising three magnet segments each having a plurality of poles which alternate and follow each other in a circumferential direction of the magnet arrangement, each magnet segment having a portion of at least one pole provided thereon such that at least one pole extends over two adjacent magnet segments with a division between adjacent segments such that the division is not centered on a pole, said three magnet segments having equal lengths, said magnet arrangement having at least four poles wherein a first of said magnet segments is occupied by a complete pole and one-third of a following second pole, that the next magnet segment is occupied by two-thirds of the second pole and two-thirds of a third pole and that the third magnet segment is occupied by one-third of the third pole and a complete fourth pole.

2. A magnet arrangement recited in claim 1, wherein, in an eight-pole magnet arrangement, a first individual segment is occupied by a complete first pole and a complete second pole and ⅔ of a third pole; that a next following second individual segment is occupied by ⅓ of the third pole and a complete fourth pole and a complete fifth pole and ⅓ of a sixth pole; and that a third individual segment is occupied by ⅔ of the sixth pole and a complete seventh pole and a complete eighth pole.

3. The magnet arrangement recited in claim 1, wherein the individual segments are arranged at the circumferential inside surface of a rotor bell of an external-rotor motor.

4. The magnet arrangement recited in claim 3, wherein the individual segments are arranged at the circumferential inside surface of a bell-shaped disk spindle of a disk memory firmly connected to the rotor shaft, the outside surface of which contains the storage disks of the disk memory.

* * * * *